United States Patent Office 3,812,086
Patented May 21, 1974

3,812,086
PROCESS FOR POLYMERIZING VINYL
CHLORIDE
Roy E. Stack, Bethel Park, Pa., assignor to
PPG Industries, Inc., Pittsburgh, Pa.
No Drawing. Filed Mar. 9, 1972, Ser. No. 233,302
Int. Cl. C08f 3/30, 15/08, 15/30
U.S. Cl. 260—87.1                       7 Claims

ABSTRACT OF THE DISCLOSURE

Vinyl chloride is polymerized in the presence of trichloroethylene containing from 0.0001–0.5 weight percent of a phenolic compound, such as hydroquinone monomethyl ether. The resin produced does not discolor excessively when subjected to heat.

DESCRIPTION OF THE INVENTION

Polymers and copolymers of vinyl chloride represent one of the most important groups of modern plastics. The utility for a particular polymer or copolymer can depend, in part, on its molecular weight, which can be controlled to a degree by the temperature maintained during the polymerization and/or by the use of chain-transfer agents. The use of chain-transfer agents, often termed modifiers, in the polymerization process controls the molecular weight of the polymer produced without reducing the rate of polymerization reaction. While the mechanism by which a chain-transfer agent functions is not known for certain, it is generally believed that the chain-transfer agent causes termination of the growing polymer chain and transfers the radical activity from the terminated chain to another monomer molecule, thereby resulting in the initiation of another polymer chain.

Trichloroethylene is used as a chain-transfer agent in the polymerization of vinyl chloride monomer. One of the principal commercial uses of trichloroethylene is for vapor degreasing of metals, such as aluminum. Thus, it is common for commercial grades of trichloroethylene to contain small amounts of additives to prevent the catalytic decomposition of trichloroethylene during such use. Additives commonly included in the stabilizer systems used for trichloroethylene are highly alkaline amine compounds, such as diisopropyl amine. It has been found that when trichloroethylene containing such amine compounds is used as a chain-transfer agent in the polymerization of vinyl chloride, the polymeric resin produced thereby tends to discolor, i.e., becomes pink and often dark brown, upon exposure to heat. The ability of polyvinyl chloride resin to withstand "pinking" during heating is an indicaton of its resistance to discoloration during subsequent commercial use of the resin.

It has now been found that polyvinyl chloride resin that is less susceptible to discoloration or pinking during exposure to heat is produced when the resin is prepared using trichloroethylene containing monoalkyl, monoaryl or monoaralkyl ether of hydroquinone, e.g., hydroquinone monomethyl ether as the principal stabilizing additive as the chain-transfer agent. The amount of such ether compound incorporated into the trichloroethylene can vary from about 0.0001 to about 0.5 weight percent, based on the trichloroethylene.

DETAILED DESCRIPTION

Trichloroethylene (1,1,2-trichloroethylene) $CHCl{=}CCl_2$ is a commercially available industrial solvent. It can be produced by the thermal dehydrochlorination of 1,1,1,2-tetrachloroethane at from about 550° C.–650° C., *J. Prakt. Chem.*, Volume 83, page 316 (1911). The thermal dehydrochlorination of tetrachloroethane at lower temperatures, e.g., 300–500° C., in the presence of a catalyst, e.g., barium chloride, barium chloride plus copper chloride, has also been described. See, for example, German Pats. 263,457, 464,320, 846,847, British Pat. 908,286, French Pat. 145,677 and U.S. Pat. 2,898,383. Trichloroethylene can also be prepared by the oxychlorination or oxyhydrochlorination of ethylene at about 400° C. See, for example, U.S. Pat. 2,308,489.

The principal commercial applications for trichloroethylene are as a vapor degreasing solvent for metal parts and as a dry cleaning solvent. The use of trichloroethylene for such applications, especially the former, subjects it to contact with materials such as aluminum and zinc. These metals catalyze the decomposition of the trichloroethylene. Decomposition products of trichloroethylene are acidic and give rise to corrosion of the metals with which the solvent may be in contact. As a result, commercial grades of trichloroethylene commonly contain additives that stabilize it against decomposition.

Apart from any additives that may be present therein, commercial grades of trichloroethylene normally contain less than the following amounts of the indicated impurities: water—100 p.p.m.; acidity (as HCl)—5 p.p.m.; insoluble residue—25 p.p.m.; free chlorine—none. The amount and the nature of the additives added to trichloroethylene will vary widely depending on the particular stabilizer system used and the intended use. Generally, the total amount of additives present in trichloroethylene does not exceed one or two weight percent; more usually less than one weight percent. The concentration of each additive individually can vary widely but usually ranges from about 0.0001 to about 0.5 weight percent, more usually from about 0.002 to about 0.4 percent by weight.

Organic amines have been widely used alone or in combination as additives to trichloroethylene. Such organic amines include aliphatic amines and basic cyclic compounds characterized by nitrogen in the ring, such as pyridine and the like, and are disclosed in U.S. Pats. 2,096,735, 2,096,736 and 2,096,737. Among the suitable amines described as additives for trichloroethylene are: pyridine, di-secondary butyl amine, diisopropyl amine, diethyl amine, n-butyl amine, amylamine, methyl pyridine, n-methyl morpholine, triethylamine, hexylamines, dipropylamine, tripropylamine, triisopropyl amine, dibutyl amine, diisobutyl amine, diethanolamine, triethanolamine, methylpyrrole, beta-picoline, pyridine, aniline and the like.

In accordance with the process of the present invention, an amine-free trichloroethylene is used as a chain-transfer agent in the polymerization of vinyl chloride monomer. Such use results in a resin which is more resistant to discoloration upon exposure to heat than resin produced with amine-containing trichloroethylene. Trichloroethylene used in the present process contains monoalkyl, monoaryl or monoaralkyl ether of hydroquinone; in the amounts described above, e.g., 0.0001–0.5 weight percent, as the principal additive incorporated to prevent oxidative decomposition. Preferably, the phenolic additive(s) is used as the sole additive. By "amine free" is meant less than 0.0005 weight percent of the organic amine compounds (and analogous amine compounds) described hereinabove. The monoethers can be represented by the general formula,

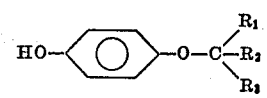

wherein $R_1$, $R_2$ and $R_3$ are each hydrogen, alkyl or aryl groups, or substituted alkyl or aryl groups. Typically, the alkyl groups contain from one to about 12 carbon atoms while the aryl groups typically contain from six to ten carbon atoms. The aryl group can be alkyl-substituted, e.g., with groups containing from one to about five carbon atoms. Further, the alkyl and aryl groups can contain other substituent groups which do not interfere with the effectiveness of the phenolic additive and which do not contain amine substituents or derivatives of amine substituents.

Among the useful monoalkyl ethers, there can be mentioned the monomethyl ether, the monoethyl ether and all of the monopropyl and monobutyl ethers of hydroquinone. Among the useful monoaralkyl ethers are such compounds as the monobenzyl, the monophenylpropyl and the monophenylethyl ethers. The monoethers can be prepared by reacting the corresponding ether with hydroquinone. For example, hydroquinone monomethyl ether can be prepared by reacting hydroquinone with dimethyl ether over a mixture of silica and alumina at 250° C.–300° C.

The amount of trichloroethylene present during polymerization of the vinyl chloride monomer as a chain-transfer agent varies typically from about one to about three percent by weight, based on the amount of vinyl chloride monomer polymerized.

The polymerization of vinyl chloride monomer is well documented in the literature and the use of trichloroethylene as a chain-transfer agent in the aforesaid polymerization is known to persons skilled in that art. Briefly, vinyl chloride can be polymerized in bulk or in an aqueous medium using emulsifying or dispersing agents, i.e., suspension or emulsion polymerizations. In a typical emulsion or suspension polymerization, water and dispersing agent are charged to the polymerization vessel, followed by the introduction of initiator, vinyl chloride monomer and trichloroethylene. The contents of the vessel are heated or allowed to come to polymerization temperature. Additional monomer and dispersing agent can be introduced to the polymerization vessel as the polymerization proceeds. If desired, the trichloroethylene and initiator can be charged together. When polymerization is completed, the polymer latex is removed and washed.

The present invention is applicable to the homopolymerization of vinyl chloride monomer, as well as the copolymerization of vinyl chloride monomer with copolymerizable ethylenically unsaturated compounds. Typically, such copolymers contain at least 50 percent by weight of vinyl chloride. Among the monomeric materials with which vinyl chloride monomer can be copolymerized, there can be mentioned vinyl acetate, vinylidene chloride, vinyl formate, vinyl benzoate, vinyl stearate, vinyl oleate, diethyl maleate, diethyl fumarate, acrylic and methacrylic esters, such as methyl acrylate, methyl methacrylate, ethyl acrylate, butyl acrylate, octyl acrylate, etc. Thus, as used herein, the term "polymerization of vinyl chloride" or the like, or vinyl chloride polymer or the like, is intended to mean and include the copolymerization of vinyl chloride with other copolymerizable monomers and copolymers of vinyl chloride respectively.

A wide variety of compounds have been reported in the literature as being useful as dispersants or emulsifiers in the polymerization of vinyl chloride monomer. Such dispersing agents can be non-ionic, cationic or anionic. Mixtures, of course, of such compounds can also be used. Typical of the emulsifying or dispersing agents used are the alkyl sulfates, alkane sulfonates, fatty acid soaps, polyvinyl alcohol, gelatin and methyl cellulose (Methocel). Other specific examples include sodium stearate, sodium oleate, ammonium oleate, potassium palmatate, sodium myristate, rosin or dehydrogenated rosin soaps, sodium lauryl sulfates, sodium isopropyl naphthalene sulfonate, dialkyl succinamates, sodium lauryl benzene sulfonate, sodium lauryl sulfate (Duponol ME), sodium alkylnaphthalene sulfonate (Ketal BX–78), the sodium salt of sulfated alkylphenoxypolyoxyethylene (Alipol CO–433), complex organic phosphate (Gafac RE–610), nonylphenoxypoly(ethyleneoxy)ethanols (Igepal CO–630 and CO–880), polyoxyethylated fatty alcohol (Emulphor ON–870), hydroxylated phosphatides of soybean oil complex (hydroxy lecithin). The amount of emulsifying or dispersing agent used can vary widely but, typically, will be used in an amount of from 0.05 to about 0.5 part per 100 parts of vinyl chloride monomer.

The polymerization or copolymerization of vinyl chloride is typically initiated with a free radical initiator. Any of the conventional free radical initiators, or combinations thereof, known in the art for the polymerization of vinyl chloride can be used in the practice of the present invention. Examples thereof include: caprylyl peroxide, hydrogen peroxide, ammonium persulfate, sodium perborate, the $C_1$–$C_{18}$ dialkyl peroxydicarbonates, such as diisopropyl peroxydicarbonate, the persulfates, diacyl peroxides, such as benzoyl peroxide and lauroyl peroxide, and the like.

Polymerization temperatures for vinyl chloride typically range from about 0° C. to about 100° C., more typically from about 35° C. to about 60° C.

The present process is more particularly described in the following Example which is intended as illustrative only since numerous modifications and variations therein will be apparent to those skilled in the art. In the Example, the amounts of each reagent used are expressed as parts per 100 parts of vinyl chloride monomer (phm.).

EXAMPLE

A standard 28 ounce polymerization bottle is filled with 200 phm. of distilled water containing 0.2 phm. of Methocel HG (a hydroxypropyl methyl cellulose). 0.027 phm. of diisopropyl peroxydicarbonate and 1.0 phm. trichloroethylene are then charged separately to the polymerization bottle. The trichloroethylene contains 0.1 weight percent, based on the trichloroethylene, of hydroquinone monomethyl ether. Thereafter, about 150 grams of vinyl chloride are charged to the bottle and the polymerization bottle is placed overnight in a polymerization bath maintained at 50° C.

The above procedure is repeated concurrently in a second polymerization bottle, except that trichloroethylene containing 0.1 weight percent of diisopropyl amine is used as the chain-transfer agent.

White granular polyvinyl chloride resin from each of the bottles is removed, washed with water and tested for heat stability by placing the resin in a pan and exposing the pan to about 400° F. for about five minutes. The resin produced using trichloroethylene containing diisopropyl amine exhibits greater discoloration, i.e., darkens to a deeper shade of brown, than the resin produced using trichloroethylene containing hydroquinone monomethyl ether.

Although the present process has been described with reference to specific details of certain embodiments thereof, it is not intended that such details should be regarded as limitations upon the scope of the invention, except as and to the extent that they are included in the accompanying claims.

I claim:

1. In the process of polymerizing vinyl chloride to form a homopolymer or a copolymer containing at least about 50 percent by weight of vinyl chloride in the presence of trichloroethylene, said trichloroethylene being present as a chain-transfer agent, the improvement which comprises utilizing trichloroethylene containing less than 0.0005 weight percent of organic amine compounds and from 0.0001 to about 0.5 weight percent of monoalkyl, monoaryl or monoaralkyl ethers of hydroquinne as the principal additive used to prevent oxidative decomposition of said trichloroethylene.

2. The process of claim 1 wherein the monoalkyl ether is hydroquinone monomethyl ether.

3. The process of claim 1 wherein the phenolic additive is represented by the general formula,

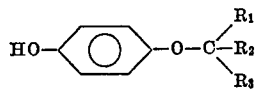

wherein $R_1$, $R_2$ and $R_3$ are hydrogen, alkyl containing from one to about 12 carbon atoms, or aryl containing from six to ten carbon atoms.

4. In the process of polymerizing vinyl chloride to form a homopolymer or a copolymer containing at least about 50 percent by weight of vinyl chloride, in an aqueous medium in the presence of trichloroethylene, said trichloroethylene being present as a chain-transfer agent, the improvement which comprises utilizing trichloroethylene containing less than .0005 weight percent of organic amine compounds and from 0.0001 to about 0.5 weight percent of hydroquinone monomethyl ether as the principle additive used to prevent oxidative decomposition of said trichloroethylene.

5. The process of claim 4 wherein vinyl chloride is copolymerized with vinyl acetate or vinylidene chloride.

6. The process of claim 4 wherein the amount of trichloroethylene used is from about 1 to about 3 weight percent based on the amount of vinyl chloride polymerized.

7. The process of claim 1 wherein the amount of trichloroethylene used is from about 1 to about 3 weight percent, based on the amount of vinyl chloride polymerized.

References Cited
UNITED STATES PATENTS

| | | | |
|---|---|---|---|
| 3,068,211 | 12/1962 | Deanin | 260—87.1 |
| 3,303,153 | 2/1967 | Jablonski et al. | 260—87.1 |
| 3,583,959 | 6/1971 | Shen et al. | 260—87.1 |
| 3,138,577 | 6/1964 | Kline et al. | 260—87.1 |
| 3,172,877 | 3/1965 | Fishbein et al. | 260—87.1 |
| 2,765,292 | 10/1956 | Groff et al. | 260—45.95 E |

HARRY WONG, JR., Primary Examiner

U.S. Cl. X.R.

260—29.6 R, 45.95 E, 78.5 CL, 86.3, 87.7, 92.8 R